(No Model.)

G. BELL.
SHIPPING BOX FOR ANIMALS.

No. 581,191. Patented Apr. 20, 1897.

Witnesses

Inventor
George Bell

UNITED STATES PATENT OFFICE.

GEORGE BELL, OF TORONTO, CANADA.

SHIPPING-BOX FOR ANIMALS.

SPECIFICATION forming part of Letters Patent No. 581,191, dated April 20, 1897.

Application filed January 31, 1896. Serial No. 577,564. (No model.)

*To all whom it may concern:*

Be it known that I, GEORGE BELL, of the city of Toronto, in the county of York, in the Province of Ontario, Canada, have invented certain new and useful Improvements in Shipping-Boxes for Animals, of which the following is a specification.

My invention relates to improvements in shipping-boxes for animals; and the object of the invention is to design a simple form of box or case in which the animal to be placed therein may receive perfect ventilation under all conditions; and it consists, essentially, in forming the box with the sides tapering inwardly from bottom to top and in providing ventilating-slots of peculiar form in the sides of the box and corner-posts extending upwardly beyond the top of the box, the lid being preferably hinged to two of the posts and designed to rest on the top of the posts, so as to also provide a ventilating-opening around the top underneath the lid, as hereinafter more particularly explained.

Figure 1:
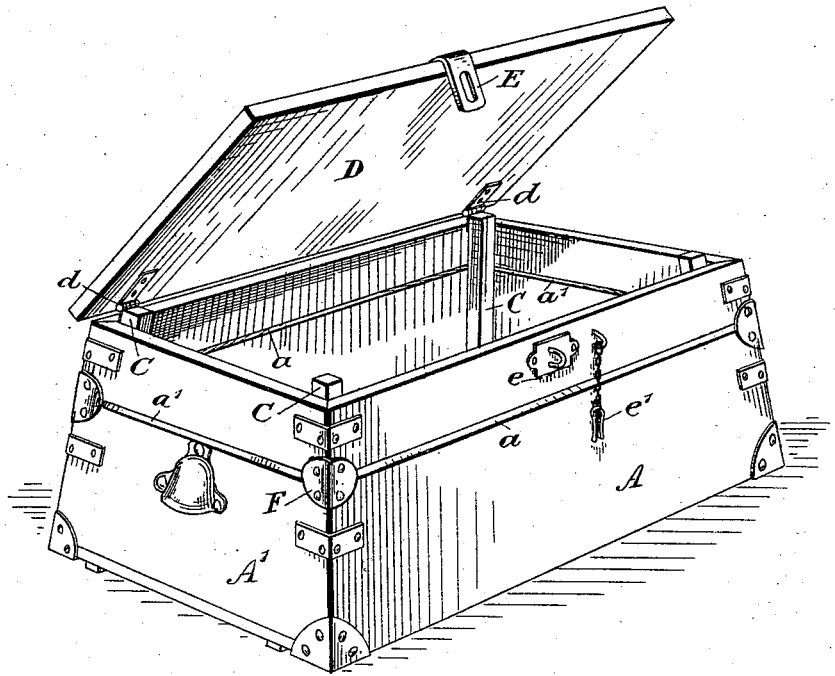
Figure 2:
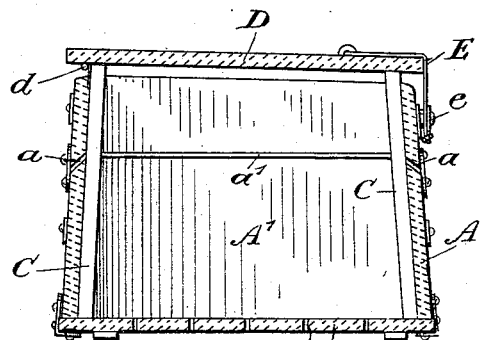

Figure 1 is a perspective view of a box constructed in accordance with my invention, showing the lid open. Fig. 2 is a cross-section of the box.

In the drawings like letters of reference indicate corresponding parts in each figure.

A A' are the sides of the box, which are tapered from the bottom to the top inwardly.

B is the bottom, which is provided with a number of drain-holes $b$.

C are the corner-posts, to which the ends of the sides are secured in any suitable manner. The tops of the posts C extend upwardly beyond the top of the sides of the box.

D is the top, which is connected by hinges $d$ to the top of two of the posts C at one side.

$a$ $a'$ are inclined slots made in the sides A A', the said slots extending upwardly from the exterior to the interior. The slots $a$ $a'$ are situated, preferably, toward the top of the sides.

E is the ordinary hasp, which when the box is closed, as shown in Fig. 2, extends over the staples $e$, fastened to the side in which the hasp may be secured by supplemental staples $e'$, connected by a chain to the staple in the side of the box.

F are corner-straps, which extend over the corners of the slots $a$ $a'$ and are designed to prevent such corners being broken. Extra straps are also provided at the corners, as indicated in the drawings.

The boxes as heretofore constructed have been made with vertical sides. The consequence was that when the animals were shipped, especially dogs for dog-shows, and the boxes placed together side by side or end to end the ventilating-openings, no matter of what form, in the sides would be completely closed and the animal would suffer and probably be suffocated. This has been only too frequently the case. Frequently, also, the dogs would catch cold on account of the ventilating-openings being holes extending directly into the side. By my inclined openings any direct draft on the dog is entirely avoided. It is with the object of remedying these evils and providing a box in which dogs may be shipped without any fear of their suffering in such shipment that my invention is chiefly designed.

What I claim as my invention is—

1. A box for shipping animals comprising an enlarged bottom, and sides tapering inwardly from bottom to top, a lid for such box and slots situated toward the tops of the sides and inclined upwardly from the exterior to the interior of box as and for the purpose specified.

2. A box for shipping animals comprising an enlarged bottom, and sides tapering inwardly from bottom to top, a lid for such box, slots situated toward the tops of the sides and inclined upwardly from the exterior to the interior of the box and projecting corner-straps extending over the corners of the slots as and for the purpose specified.

GEORGE BELL.

Witnesses:
 B. BOYD,
 H. DENNISON.